(12) United States Patent
Scholz et al.

(10) Patent No.: US 11,716,995 B2
(45) Date of Patent: Aug. 8, 2023

(54) METHOD OF PRODUCING AN ANTIMICROBIAL AGENT

(71) Applicant: Active Micro Technologies, LLC, Lincolnton, NC (US)

(72) Inventors: Durant Scholz, Lincolnton, NC (US); Tiffany Russell, Dallas, NC (US); Erica Segura, Lincolnton, NC (US); Anna Crovetto, Hamburg (DE); Maureen Danaher, Charlotte, NC (US); Monica Beltran, Fort Mill, SC (US); Parisa Mehrzadeh, Huntersville, NC (US)

(73) Assignee: Active Micro Technologies, LLC, Lincolnton, NC (US)

( * ) Notice: Subject to any disclaimer, the term of this patent is extended or adjusted under 35 U.S.C. 154(b) by 253 days.

(21) Appl. No.: 17/086,969

(22) Filed: Nov. 2, 2020

(65) Prior Publication Data
US 2022/0132863 A1 May 5, 2022

(51) Int. Cl.
*A01N 63/32* (2020.01)
*A01N 65/08* (2009.01)
*A01N 65/00* (2009.01)

(52) U.S. Cl.
CPC .............. *A01N 63/32* (2020.01); *A01N 65/00* (2013.01); *A01N 65/08* (2013.01)

(58) Field of Classification Search
CPC ......... A01N 63/32; A01N 65/00; A01N 65/08
USPC ..................................................... 424/93.51
See application file for complete search history.

(56) References Cited

U.S. PATENT DOCUMENTS

| 8,765,138 | B2 | 7/2014 | Stamets |
| 9,095,143 | B2 | 8/2015 | Iwahara et al. |
| 2009/0130138 | A1 | 5/2009 | Stamets |
| 2010/0285054 | A1 | 11/2010 | De Souza et al. |
| 2019/0254305 | A1* | 8/2019 | Kelly ....................... A23G 1/02 |

FOREIGN PATENT DOCUMENTS

WO  WO 2015/013840  *  2/2015

OTHER PUBLICATIONS

Cecchini et al., The potential use of yeast lees (1-3, 1-6)-B-Glucans as functional food ingredients, Internet Journal of Enology and Viticulture, (2016), N. 4/1, pp. 1-5.*
Kaur H, Sharma S, Khanna PK, Kapoor S. Evaluation of Ganoderma lucidum strains for the production of bioactive components and their potential use as antimicrobial agents. Journal of Applied and Natural Science. Jun. 1, 2015;7(1):298-303.

* cited by examiner

*Primary Examiner* — Jennifer M. H. Tichy
(74) *Attorney, Agent, or Firm* — Lerner David LLP

(57) ABSTRACT

A method for producing an antimicrobial agent is provided. The method includes co-fermenting at least one seed of *Lepidium Sativum* and at least one yeast in a growth media to produce a yeast lees co-fermented by-product. The yeast lees by-product is then applied to a growth medium and at least one cell of *Ganoderma Lucidum* as a liquid medium under controlled conditions to produce mycelium and the liquid medium is agitated. The liquid medium is then filtered to isolate and extract an antimicrobial agent.

16 Claims, No Drawings

METHOD OF PRODUCING AN ANTIMICROBIAL AGENT

BACKGROUND OF THE DISCLOSURE

The present disclosure relates to a method of producing an antimicrobial agent, and more specifically, the use of the antimicrobial agent to maintain the microbiological safety of cosmetic and personal care formulations.

Enhanced product safety regulations have driven consumers to elect natural preservatives for cosmetic and personal care products. Concerned with their environmental impact, consumers are also looking for sustainable products that reuse, recycle and reduce their environmental footprint and energy consumption.

The Reishi mushroom, *Ganoderma lucidum*, is a species of medicinal mushroom used for thousands of years in traditional Chinese medicine. It is regarded as a remedy for several types of diseases as a result of its rich profile of bioactive compounds such as proteins, enzymes, polysaccharides, flavanoids, alkaloids and coumarins. Reishi mushroom reproduces by the process of spore germination to produce hyphae. Hyphae are branched tubular structures that transport nutrients and information from its surroundings. Mycelium is the vegetative part of the fungus consisting of a network of single-cell interwoven hyphae. This network of mycelium maximizes contact with any available food source for greater nutrient absorption. If conditions are favorable, the collective mycelium may send out a bloom. This bloom manifests in a visible fruiting body mushroom. Reishi mycelium, spores and fruiting body are commercially available in different forms such as powders, dietary supplements and tea. Recent studies on Reishi have shown various biological actives including anti-tumor, anti-inflammatory and antimicrobial effects.

Several industries including wine production and cosmetics industries, utilize yeast fermentation methods in order to transform energy rich complex compounds into simple compounds that are rich in vitamins, peptides, beneficial enzymes and probiotics. After the fermentation process is complete, a waste product, known as yeast lees is left behind. Yeast lees are the dead yeast cells and organic material that remains after a ferment is filtered. These lees are the remaining yeast particles from autolysis, which is the destruction of yeast cells by enzymes during the fermentation process. Normally, this waste needs to be correctly disposed of, but the current disclosure recycles the yeast lees waste from the co-fermentation of *Saccharomyces cerevisiae* and *Lepidium sativum* seeds to create a more effective antimicrobial when repurposed with *Ganoderma lucidum*.

Although recent studies have demonstrated Reishi mycelium's antimicrobial properties, it has not been an effective antimicrobial agent when added to aqueous cosmetic and personal care formulations alone.

SUMMARY OF THE DISCLOSURE

The antimicrobial agent of the present disclosure may maintain the microbiological safety of cosmetic and personal care formulations by reducing the amount of microbial contaminants, in turn, reducing or inhibiting bacterial and/or fungal growth. The present disclosure relates to a sustainable antimicrobial agent that can be generated from recycled yeast lees. This product provides a natural antimicrobial alternative to harsh synthetic products.

The present disclosure addresses the need for a natural, sustainable preservative system by providing an antimicrobial agent, and an associated method to produce the antimicrobial agent.

In the present disclosure, the addition of yeast lees in the growth medium of *Ganoderma lucidum* increased the antimicrobial activity of the mycelium due to a greater accumulation of bioactive compounds compared to mycelium grown in the culture medium alone. The influence of the yeast lees evoked an alteration in the metabolic profile of the mycelium and increased its antimicrobial properties allowing the mycelium extract to be an effective antimicrobial in aqueous cosmetic and personal care formulations.

In an embodiment, a method for producing an antimicrobial agent includes co-fermenting at least one seed of *Lepidium Sativum* and at least one yeast, the co-fermentation process generating a by-product, wherein the by-product comprises a yeast lees; adding the yeast lees to a growth medium to form a mixture; inoculating the mixture of growth medium containing the yeast lees with at least one cell of *Ganoderma Lucidum* to produce mycelium; agitating the inoculated mixture; and filtering the agitated mixture to isolate and extract an antimicrobial agent from the mycelium. The at least one yeast may be *Saccharomyces cerevisiae*. The yeast lees may include a polysaccharide, a glycoprotein, a mannoprotein, an organic acid, tannic acid, chitin, tartaric acid, an amino acid, lysine, arginine, aspartic acid, protein-tannin complexes, or a combination thereof. The growth medium may include Potato Dextrose Broth (PDB). The inoculating step may be performed at a temperature of about 24° C. and at a pH range between about 5.4 to about 5.8 for between about 2 and about 3 days. The agitating step may be performed between about 3 and about 5 days. The antimicrobial agent includes a secondary metabolite. The secondary metabolite may be lipopeptides, lipoamino acids, or polysaccharides In an additional embodiment, a method for producing an antimicrobial agent, may include inoculating the mixture of growth medium containing a yeast lees with at least one cell of *Ganoderma Lucidum* to produce mycelium, agitating the inoculated mixture, filtering the agitated mixture to isolate and extract an antimicrobial agent from the mycelium, wherein the growth medium is produced by a method comprising: co-fermenting at least one seed of *Lepidium Sativum* and at least one yeast, the co-fermentation process generating a by-product, wherein the by-product comprises the yeast lees, adding the yeast lees to the growth medium.

DETAILED DESCRIPTION

The present disclosure provides a method for producing an antimicrobial agent for use in the prevention and inhibition of microbial growth in aqueous cosmetic and personal care compositions and an antimicrobial agent produced by the method.

In one embodiment, an antimicrobial agent is produced, and included in a composition to form a product via any method known by those skilled in the art. In some embodiments, the composition may be a cosmetic or personal care product. The antimicrobial agent may be produced by co-fermenting at least one seed of *Lepidium Sativum* and at least one yeast to form a yeast lees. The yeast lees may then be incorporated with growth medium and the growth medium containing the yeast lees may be inoculated with at least one cell of *Ganoderma Lucidum* to produce mycelium. The antimicrobial agent is then extracted from the mycelium. In some embodiments, the composition in which the antimicrobial agent is included may contain an aqueous content. The water content of the aqueous product may be greater than or equal to 80%. It should be appreciated that the form of antimicrobial agents and any compositions exemplified are not limited to the examples listed herein and any form of products are contemplated.

The antimicrobial agent may inhibit or prevent the microbial growth within the composition. For example, the microbial growth may include any species of the genus *Escherichia*, *Pseudomonas*, *Staphylococcus*, *Aspergillus* or *Candida*. In an addition, the microbial growth may include *Escherichia coli*, *Pseudomonas aeruginosa*, *Staphylococcus aureus*, *Aspergillus brasiliensis* or *Candida albicans*. It should be appreciated that the genus and species of the microbial growth are not limited to the examples provided herein and any other genus and species are contemplated.

In an additional embodiment, a method for producing an antimicrobial agent is provided. A yeast and *Lepidium sativum* seeds are co-fermented together to generate a yeast lees waste by-product. In some embodiments, the co-fermentation process may include at least one seed of *Lepidium sativum* and at least one cell of yeast. In other embodiments, the co-fermentation process may include a ratio of seeds of *Lepidium sativum* to yeast of about 1:10 to about 6:10 (v/v), where a concentration of the yeast may be from about $10^4$ to $10^7$ cells/g. In one embodiment, the ratio of seeds of *Lepidium sativum* to yeast may be about 3:10 (v/v). The co-fermentation process may occur at a temperature from about 15° C. to about 25° C. for about 10 to about 20 hours. In other embodiments, the co-fermentation process may occur at a temperature from about 18° C. to about 22° C. for about 12 hours to about 18 hours, but is not limited to these conditions. As stated above, co-fermentation of the yeast and *Lepidium sativum* produces yeast lees. When co-fermentation of the yeast and *Lepidium sativum* seeds is complete, the yeast lees may be extracted by various extraction methods including, but not limited to, a gravity filtration method. The yeast lees is then combined with a growth medium and is mixed until the yeast lees is fully dispersed, forming a mixture. In some embodiments, the yeast may be selected from *Saccharomyces cerevisiae* and the growth medium may be selected from Potato Dextrose Broth (PDB), which may consist of Diced Potatoes, Glucose, Water and a combination thereof. It should be appreciated that the yeast and the growth medium are not limited to the examples described herein and other examples are contemplated. In some embodiments, the amount of yeast lees added to the growth medium is about 1% to 20% of the total composition of the yeast lees and growth medium. In some embodiments, the amount of growth medium added is about 80% to about 99% of the total composition of the yeast lees and growth medium. The yeast lees and growth medium are mixed together until the yeast lees is fully dispersed in the growth medium to form a mixture.

In some embodiments, the mixture of yeast lees and growth medium may be inoculated with at least one cell of *Ganoderma lucidum*. In some embodiments, the incubation period of *Ganoderma lucidum* may be maintained at a temperature of about 22° C. to about 26° C. and may occur for a time period range between about 2 days and about 3 days to produce mycelium. The mycelium growth process may be maintained at a pH range of about 5.4 to about 5.8. Once the mycelium has formed, the growth medium containing the mycelium may be agitated at a temperature range of about 20° C. to about 24° C. and may occur for a time period between about 3 and 5 days. A visual test may be used to determine if the mycelium formed.

Subsequent to the agitation and growth process, one or more filtration methods may be applied to the growth medium containing mycelium to isolate and extract secondary metabolites to use as the antimicrobial agent. In some embodiments, the filtration method may be pressure filtration to collect the supernatant. In some embodiments, at least one filtration method may include a solvent separation method, which may be performed by pressure filtration in which a fiber cloth filter collects the solid matter preventing transfer to the liquid phase. The fiber cloth filter may be selective for particle sizes no greater than 20 μm. If pressure filtration is used, the pressure may range from about 3 kg/cm² to about 7 kg/cm² and the flow rate of the sample through the pressure filtration may be from about 100 mL/min to about 175 mL/min. The solid matter collected may be discarded as waste material or repurposed. The filtration method is performed until about all of the mixture of growth medium containing mycelium passes through. During the filtration method, liquid is collected which is the mycelium extract including secondary metabolites. The secondary metabolites may include organic materials configured to prevent or reduce disease caused by microbials by suppressing metabolic functions, inhibiting cell wall synthesis, and/or lysing Gram negative and Gram positive bacteria, mold and yeast cells. In some embodiments, the secondary metabolites may include lipopeptides, lipoamino acids, and polysaccharides.

A composition may be prepared using the antimicrobial agent formed from the yeast lees that is produced as described above and is combined with *Ganoderma lucidum* as described above. The composition may be a cosmetic or personal care formulation. In one embodiment, the composition may contain between about 2% and about 10% of the antimicrobial agent to effectively inhibit the growth of bacteria in the composition.

EXAMPLES

Hereinafter, the present application will be specifically described by way of examples, but the scope of the present application is not limited by the following examples. The antimicrobial agent was prepared according to the following examples.

Preparation Example 1—*Saccharomyces/Lepidium Sativum* Seed (Garden Cress) Ferment Lysate An antimicrobial agent was prepared by co-fermenting *Saccharomyces cerevisiae* and *Lepidium sativum* seeds in a ratio of 3:10 (v/v) at 20° C. for 12 to 18 hours. After 12 to 18 hours, *Saccharomyces/Lepidium sativum* Seed Ferment Lysate and yeast lees are produced. The yeast lees was collected by a gravity filtration method. Then, the *Saccharomyces/Lepidium sativum* Seed Ferment Lysate was mixed with Potato Dextrose Broth until the *Saccharomyces/Lepidium sativum* Seed Ferment Lysate was fully dispersed to form a mixture. The mixture was then inoculated for 2 to 3 days at a temperature of 22° C. and pH of 5.6 to form an antimicrobial agent. The mixture was then agitated at a temperature of 22° C. for 3 to 5 days. After inoculation and agitation, the mixture was then filtered using a pressure filtration method at a pressure of 3 kg/cm² to 7 kg/cm². The liquid collected from filtration formed an antimicrobial agent from *Saccharomyces/Lepidium sativum* Seed Ferment Lysate.

Preparation Example 2—*Ganoderma lucidum* (Reishi Mushroom) Mycelium Cell Extract An antimicrobial agent was prepared by adding *Ganoderma lucidum* to Potato Dextrose Broth (PDB). After the *Ganoderma lucidum* was added to the PDB, the mixture was agitated at a temperature of 22° C. for 3 to 5 days. After agitation, the mixture was filtered using a pressure filtration method at a pressure of 3 kg/cm$^2$ to 7 kg/cm$^2$. Thus, the liquid collected from filtration formed an antimicrobial agent from *Ganoderma lucidum* mycelium cell extract.

Preparation Example 3—*Ganoderma lucidum* (Reishi Mushroom) Mycelium Cell Extract Cultured on Media Supplemented with Yeast Lees from *Saccharomyces cerevisiae* Fermentation An antimicrobial agent was prepared by fermenting *Saccharomyces cerevisiae* at 20° C. for 12 to 18 hours. After 12 to 18 hours, *Saccharomyces* Ferment Lysate and yeast lees are produced. The yeast lees was collected by a gravity filtration method. The yeast lees was mixed with Potato Dextrose Broth until the yeast lees was fully dispersed to form a mixture. The mixture was then inoculated for 2 to 3 days at a temperature of 22° C. and pH of 5.6. After inoculation, *Ganoderma lucidum* was added to PDB, where the mixture was agitated at a temperature of 22° C. for 3 to 5 days. After agitation, the mixture was filtered using a pressure filtration method at a pressure of 3 kg/cm$^2$ to 7 kg/cm$^2$. Thus, the liquid collected from filtration included the *Ganoderma lucidum* mycelium cell extract cultured on media supplemented with yeast lees from *Saccharomyces cerevisiae* fermentation.

Preparation Example 4—*Ganoderma lucidum* (Reishi Mushroom) Mycelium Cell Extract Cultured on Media Supplemented with Yeast Lees from *Saccharomyces/Lepidium Sativum* Seeds Fermentation An antimicrobial agent was prepared by co-fermenting *Saccharomyces cerevisiae* and *Lepidium sativum* seeds in at ratio of 3:10 (v/v) in at 20° C. for 12 to 18 hours. After 12 to 18 hours, *Saccharomyces/Lepidium sativum* Seed Ferment Lysate and yeast lees are produced. The yeast lees was collected by a gravity filtration method. The yeast lees was then mixed with Potato Dextrose Broth until the yeast lees was fully dispersed to form a mixture. The mixture was then inoculated for 2 to 3 days at a temperature of 22° C. and pH of 5.6. After inoculation, *Ganoderma lucidum* was added to PDB, where the mixture was agitated at a temperature of 22° C. for 3 to 5 days. After agitation, the mixture was filtered using a pressure filtration method at a pressure of 3 kg/cm$^2$ to 7 kg/cm$^2$. Thus, the liquid collected from filtration included the *Ganoderma lucidum* mycelium cell extract cultured on media supplemented with yeast lees from *Saccharomyces/Lepidium sativum* seeds fermentation to form an antimicrobial agent.

Preparation Example 5—Yeast Lees Extract

An antimicrobial agent was prepared by co-fermenting *Saccharomyces cerevisiae* and *Lepidium sativum* seeds in a ratio of 3:10 (v/v) at 20° C. for 12 to 18 hours. After 12 to 18 hours, *Saccharomyces/Lepidium sativum* Seed Ferment Lysate and yeast lees are produced. The yeast lees was collected by a gravity filtration method. The yeast lees was mixed with Potato Dextrose Broth until the yeast lees was fully dispersed to form a mixture. The mixture was then inoculated for 2 to 3 days at a temperature of 22° C. and pH of 5.6 to form an antimicrobial agent. The mixture was then agitated at a temperature of 22° C. for 3 to 5 days. After inoculation and agitation, the mixture was then filtered using a pressure filtration method at a pressure of 3 kg/cm$^2$ to 7 kg/cm$^2$. The liquid collected from filtration formed an antimicrobial agent from *Saccharomyces/Lepidium sativum* Seed Ferment Lysate.

Example 1: Minimum Inhibitory Concentration Test Using the Antimicrobial Agent A Minimum Inhibitory Concentration (MIC) test was conducted to evaluate antimicrobial activity of the novel antimicrobial agent compared to separate or single-paired cultures. In the MIC test, the minimum inhibitory concentration required to inhibit the growth of bacteria was determined. Specifically, the minimum inhibitory concentration required to inhibit the growth and proliferation of Gram-negative bacteria *Escherichia coli* and *Pseudomonas aeruginosa*, Gram-positive bacteria *Staphylococcus aureus*, mold *Aspergillus brasiliensis* and yeast *Candida albicans* was tested.

Using aseptic technique, sufficient quantity of each test microorganism was added to separate test tubes containing 2.0 ml of 0.85% normal sterile saline solution to match the turbidity of a 0.5 McFarland standard ($10^6$ to $10^8$ colony forming units [CFU]/ml). A sterile cotton swab was used to transfer *Aspergillus brasiliensis*, while a sterile loop was used to transfer *Escherichia coli*, *Staphylococcus aureus*, *Pseudomonas aeruginosa* and *Candida albicans*.

Then, 450 µl of each diluted cell suspension was added to 45 mL sterile saline solution, yielding a final inoculum concentration between $10^4$ and $10^6$ CFU/ml. To perform the test with *Escherichia coli*, *Staphylococcus aureus* and *Pseudomonas aeruginosa*, 150 µl of double strength Tryptic Soy Broth were added to the first column of wells in a sterile 96 micro-well plate using a multichannel pipette. For *Aspergillus brasiliensis* and *Candida albicans*, 150 µl of double strength Sabouraud Dextrose Broth were added to the first column of wells in a sterile 96 micro-well plate using a multichannel pipette. 150 µl of each single strength broth were added into the remaining wells of the sterile 96 micro-well plate. 150 µl of the extract to be tested were added into the first column of the sterile 96 micro-well plate containing the double strength broth. The dilution was mixed thoroughly by withdrawing and re-pipetting 150 µl volumes five times. 150 µl of the well-mixed broth containing the extract was removed from the first column and added to the 2$^{nd}$ column sterile of the 96 micro-well plate. The mixing procedure was repeated five times.

The mixing procedure continued for the remainder of the wells of the sterile 96 micro-well plate, until the last column. The last column of the plate did not received diluted extract and was consider as a positive control for the microorganisms tested on each specific sterile 96 micro-well plate. Each sterile 96 micro-well plate was inoculated with the five different microorganisms in separate using a sterile 95-Pin inoculation assembly. Each 96 micro-well plate was covered with a sterile sealing tape for incubation period. *Escherichia coli*, *Staphylococcus aureus* and *Pseudomonas aeruginosa* plates were incubated for 48 hours at 35+/−2° C. *Aspergillus brasiliensis* and *Candida albicans* plates were incubated for 5 to 7 days at 25+/−2° C.

After incubation period, the 96 micro-well plates were examined and the results were recorded based on the calculated Minimum Inhibitory Concentration value. The Minimum Inhibitory Concentration value was calculated according to Equation 1 below. The MIC results are displayed in Table 1.

$$\% MIC\ concentration\ vlaue = \frac{Starting\ test\ product\ concentration}{Dilution\ Factor\ for\ the\ last\ well\ showing\ no\ growth}$$

Equation 1

TABLE 1

Minimum Inhibitory Concentration Test Results

| Extracts | Microorganisms | | | | |
|---|---|---|---|---|---|
|  | *Escherichia coli* ATCC 8739 | *Staphylococcus aureus* ATCC 6538 | *Pseudomonas aeruginosa* ATCC 9027 | *Candida albicans* ATCC 10231 | *Aspergillus brasiliensis* ATCC 16404 |
| Preparation Example 1 | 4.0 | 4.0 | 4.0 | 4.0 | 4.0 |
| Preparation Example 2 | 4.0 | 4.0 | 4.0 | 4.0 | 4.0 |
| Preparation Example 3 | 2.0 | 2.0 | 2.0 | 2.0 | 2.0 |
| Preparation Example 4 | 0.5 | 0.5 | 0.5 | 0.5 | 0.5 |
| Preparation Example 5 | >8.0 | >8.0 | >8.0 | >8.0 | >8.0 |

In Table 1, only 0.5% of the antimicrobial agent of the present disclosure is required to inhibit the growth of *Escherichia coli, Pseudomonas aeruginosa, Staphylococcus aureus, Aspergillus brasiliensis* and *Candida albicans*. In contrast, the respective extracts tested had a significantly higher Minimum Inhibitory Concentration value and required a greater percentage to inhibit the growth of microorganisms. The results demonstrate optimized antimicrobial efficacy of the novel antimicrobial agent.

Example 2: Antimicrobial Efficacy Test with the Antimicrobial Agent

An Antimicrobial Efficacy Test was performed to determine the efficacy of the antimicrobial agent of Preparation Example 4 in an aqueous cosmetic formulation against bioburden as a function of time.

Twenty grams of aqueous Witch Hazel Hydrosol formula with 4% antimicrobial agent of Preparation Example 4 was weighed into five individual containers. Each container was inoculated with one of the five test organisms. The inoculum concentration for each organism was standardized using the 0.5 McFarland turbidity standard and further diluted to yield approximately $10^6$ to $10^8$ microorganisms/ml. The amount of each inoculum added to each sample was no more than 1% of the product weight, as to not alter the product composition. The inoculated samples were evaluated 0, 7, 14, 21, and 28 days after the initial inoculation to determine quantitatively the number of viable microorganisms remaining. On the 28$^{th}$ day of testing the samples were re-inoculated and evaluated 7, 14, 21, and 28 days after the second exposure to determine the number of viable microorganisms. Table 2 represents the percent reduction of viable organisms after being introduced into the test formulation.

The result of the Antimicrobial Efficacy test demonstrates the effectiveness of the antimicrobial agent used in the aqueous cosmetic formulation, Witch Hazel Hydrosol. As seen in Table 2, the Gram positive and Gram negative bacteria as well as the yeast and mold were reduced by greater than 99% within 7 days of each challenge test. By the end of the 28-day test period, all Gram positive and Gram negative bacteria as well as the yeast and mold were reduced by 99.999% or greater.

TABLE 2

Tests Results of Antimicrobial Efficacy test

| | Organisms | | | | |
|---|---|---|---|---|---|
| | *E. coli* | *P. aeruginosa* | *S. aureus* | *A. brasillensis* | *C. albicans* |
| | Inoculum (initial) CFU/ml | | | | |
| | $6.1 \times 10^6$ | $2.0 \times 10^6$ | $3.2 \times 10^6$ | $6.0 \times 10^5$ | $6.4 \times 10^5$ |
| Day 0 | >99.999% | 99.964% | 99.681% | 99.996% | >99.999% |
| Day 7 | >99.999% | >99.999% | >99.999% | >99.999% | >99.999% |
| Day 14 | >99.999% | >99.999% | >99.999% | >99.999% | >99.999% |
| Day 21 | >99.999% | >99.999% | >99.999% | >99.999% | >99.999% |
| Day 28 | >99.999% | >99.999% | >99.999% | >99.999% | >99.999% |
| | Inoculum (re-inoculated) CFU/ml | | | | |
| | $8.0 \times 10^6$ | $6.6 \times 10^5$ | $6.4 \times 10^6$ | $5.0 \times 10^5$ | $7.0 \times 10^5$ |
| Day 7 | >99.999% | 99.999% | >99.999% | >99.999% | >99.999% |
| Day 14 | >99.999% | >99.999% | >99.999% | >99.999% | >99.999% |
| Day 21 | >99.999% | >99.999% | >99.999% | >99.999% | >99.999% |
| Day 28 | >99.999% | >99.999% | >99.999% | >99.999% | >99.999% |

The invention claimed is:

1. A method for producing an antimicrobial agent, comprising
   co-fermenting at least one seed of *Lepidium Sativum* and at least one yeast, the co-fermentation process generating a by-product comprising a yeast lees,
   extracting the yeast lees,
   adding the extracted yeast lees to a growth medium to form a mixture, inoculating the mixture with at least one cell of *Ganoderma Lucidum* to produce an inoculated mixture comprising mycelium, agitating the inoculated mixture, and filtering the agitated mixture to isolate and extract the antimicrobial agent from the mycelium.

2. The method of claim 1, wherein the at least one yeast is *Saccharomyces cerevisiae*.

3. The method of claim 1, wherein the yeast lees includes a polysaccharide, a glycoprotein, a mannoprotein, an organic acid, tannic acid, chitin, tartaric acid, an amino acid, lysine, arginine, aspartic acid, protein-tannin complexes, or a combination thereof.

4. The method of claim 1, wherein the growth medium includes Potato Dextrose Broth (PDB).

5. The method of claim 1, wherein the inoculating step is performed at a temperature of about 24° C. and at a pH range between about 5.4 to about 5.8 for about 2 to about 3 days.

6. The method of claim 1, wherein the agitating step is performed between about 3 to about 5 days.

7. The method of claim 1, wherein the antimicrobial agent includes a secondary metabolite.

8. The method of claim 7, wherein the secondary metabolite is lipopeptides, lipoamino acids, or polysaccharides.

9. A method for producing an antimicrobial agent, comprising inoculating a mixture with at least one cell of *Ganoderma Lucidum* to produce an inoculated mixture comprising mycelium, wherein the mixture comprises a growth medium and yeast lees, agitating the inoculated mixture, filtering the agitated mixture to isolate and extract the antimicrobial agent from the mycelium, and prior to the inoculating, providing the mixture by co-fermenting at least one seed of *Lepidium Sativum* and at least one yeast to generate a by-product comprising the yeast lees, and adding the yeast lees to the growth medium.

10. The method of claim 9, wherein the at least one yeast is *Saccharomyces cerevisiae*.

11. The method of claim 9, wherein the yeast lees includes a polysaccharide, a glycoprotein, a mannoprotein, an organic acid, tannic acid, chitin, tartaric acid, an amino acid, lysine, arginine, aspartic acid, protein-tannin complexes, or a combination thereof.

12. The method of claim 9, wherein the growth medium includes Potato Dextrose Broth (PDB).

13. The method of claim 9, wherein the inoculating step is performed at a temperature of about 24° C. and at a pH range between about 5.4 to about 5.8 for about 2 to about 3 days.

14. The method of claim 9, wherein the agitating step is performed between about 3 to about 5 days.

15. The method of claim 9, wherein the antimicrobial agent includes a secondary metabolite.

16. The method of claim 15, wherein the secondary metabolite is lipopeptides, lipoamino acids, or polysaccharides.

* * * * *